United States Patent [19]

Patsiokas et al.

[11] Patent Number: 4,941,203
[45] Date of Patent: Jul. 10, 1990

[54] TWO-WAY RADIO COMMUNICATION SYSTEM HAVING SELECTABLE OPERATING MODES

[75] Inventors: Stelios J. Patsiokas, Plantation; Morris A. Moore, West Palm Beach; Brian K. A. Johnson, Coral Springs, all of Fla.

[73] Assignee: Motorola, Inc., Schaumburg, Ill.

[21] Appl. No.: 434,633

[22] Filed: Nov. 13, 1989

Related U.S. Application Data

[63] Continuation of Ser. No. 242,838, Sep. 12, 1988, abandoned.

[51] Int. Cl.$^5$ .................................................. H04B 1/00
[52] U.S. Cl. .................................. 455/53; 340/825.44; 379/67; 379/77
[58] Field of Search .................... 455/53, 33, 56, 54, 455/34, 67, 68, 38; 379/77, 88, 157, 70, 67, 74, 61; 340/825.44, 825.66

[56] References Cited

U.S. PATENT DOCUMENTS

| | | | |
|---|---|---|---|
| 4,172,969 | 10/1979 | Levine et al. | 340/825.69 |
| 4,266,098 | 5/1981 | Novak | 379/77 |
| 4,336,524 | 6/1982 | Levine | 340/825.44 |
| 4,468,813 | 8/1984 | Burke et al. | 455/38 |
| 4,495,647 | 1/1985 | Burke et al. | 455/38 |
| 4,644,351 | 2/1987 | Zabarsky et al. | 455/53 |
| 4,677,655 | 6/1987 | Hashimoto | 379/61 |
| 4,680,785 | 7/1987 | Akiyama et al. | 379/57 |
| 4,748,655 | 5/1988 | Thrower et al. | 379/57 |
| 4,783,800 | 11/1988 | Levine | 379/67 |

Primary Examiner—Reinhard J. Eisenzopf
Assistant Examiner—Curtis Kuntz
Attorney, Agent, or Firm—Thomas G. Berry

[57] ABSTRACT

A radio communication system includes a base station and a plurality of remote units. The remote units can be operated in one of several modes. In the Message Storage mode, a telephone or remote unit caller is verbally informed that the called remote unit is not receiving calls, and the caller is then given the option to store a voice or numeric message for later transmission to the called remote unit. If a caller enters an Override code, however, the system attempts to establish voice communication between the caller and the called remote unit. In the Call Screening mode, the caller's message is stored in the base station and, simultaneously, forwarded to the called remote unit. During reception of the message, the called remote unit can "pickup" the call and begin normal voice communications with the caller. When a remote unit changes from the Message Storage mode to some other mode, its stored messages are automatically forwarded to the remote unit. If the remote unit is busy, out of radio transmission range, or doesn't respond to a call, the caller is given an opportunity to store a message.

23 Claims, 6 Drawing Sheets

TWO-WAY RADIO COMMUNICATION SYSTEM HAVING SELECTABLE OPERATING MODES

This is a continuation of application Ser. No. 07/242,838, filed Sept. 12, 1988 and now abandoned.

BACKGROUND of the INVENTION

This invention pertains to radio communication systems and, more particularly, to a two-way radio communication system in which individual remote radio transceiver units can be placed in one of a plurality of stimulated telephone answering machine modes.

Telephone answering machines have several different modes of operation. In one mode, for example, a caller may be invited to record a message immediately upon establishing a connection with the called telephone unit. In another mode, an attempt is made to establish voice communications between the caller and the called unit by "ringing" the called unit. If the called unit fails to answer after a predetermined number of rings, the caller is invited to record a message. In either of these two modes of operation, the operator of the called unit can usually monitor the incoming message as it is being recorded. While monitoring the incoming message, the operator of the called unit usually has the option of interrupting the message by picking up the call, thereby establishing voice communications between the caller and the called unit.

It would be desirable if a two-way radio communication system could be designed that emulated the operation of a telephone answering machine in a two-way radio communication system. Accordingly, the invention described below provides the above described telephone machine operating modes and features. This invention also provides additional features not available in answering machines, such as the ability to record messages when a remote radio transceiver unit is out of range of its base station, or when the remote unit is busy with another call. This invention also permits a call originator to override the message recording process and establish a direct voice communication connection to the called unit.

SUMMARY OF THE INVENTION

Briefly, the invention is a radio communications system that includes a remote radio unit and a radio base station. The remote radio unit includes a remote unit transceiver means, a selecting means and a code transmitting means. The remote unit transceiver means transmits radio signals to and receives radio signals from a base station. The selecting means selects one of a plurality of operating modes. The operating modes include a Message Storage mode and an Open Communication mode. The code transmitting means transmits a code indicative of the selected operating mode. The base station includes a base station transceiver means, a code storing means, a means for communicating with a first call originator, message storing means and voice communicating means. The base station transceiver means transmits radio signals to and receives radio signals from the remote unit. The code storing means stores the code transmitted by the remote unit and received by the base station transceiver means. The message storing means stores a message from the call originator when the code stored in the code storing means is indicative of the Message Storage mode. The voice communicating means established voice communications between the call originator and the remote unit when the code stored in the code storing means is indicative of the Open Communication mode.

In another embodiment, the invention is a radio base station for use with a remote radio transceiver unit that includes means for transmitting a code indicative of a selected operating mode. The base station includes the base station transceiver means, the code storing means, the means for communicating with a first call originator, the message storing means and the voice communicating means that are described in the above paragraph.

In still another embodiment, the invention is a remote radio unit for use with a radio base station that includes code storing means for storing a code transmitted by said remote unit, means for communicating with a call originator and a message storing means for storing a message from the call originator. The remote unit includes the remote unit transceiver means and the selecting means described above. Included is a means for transmitting a first code indicative of the Message Storage mode, such that transmitting the first code to the base station enables the base station to store a message from the call originator. Also included is a means for transmitting a second code indicative of the Open Communication mode, such that transmitting the second code to the base station enables the base station to establish voice communications between the call originator and the remote unit.

DESCRIPTION of the PREFERRED EMBODIMENT

Figure 1:
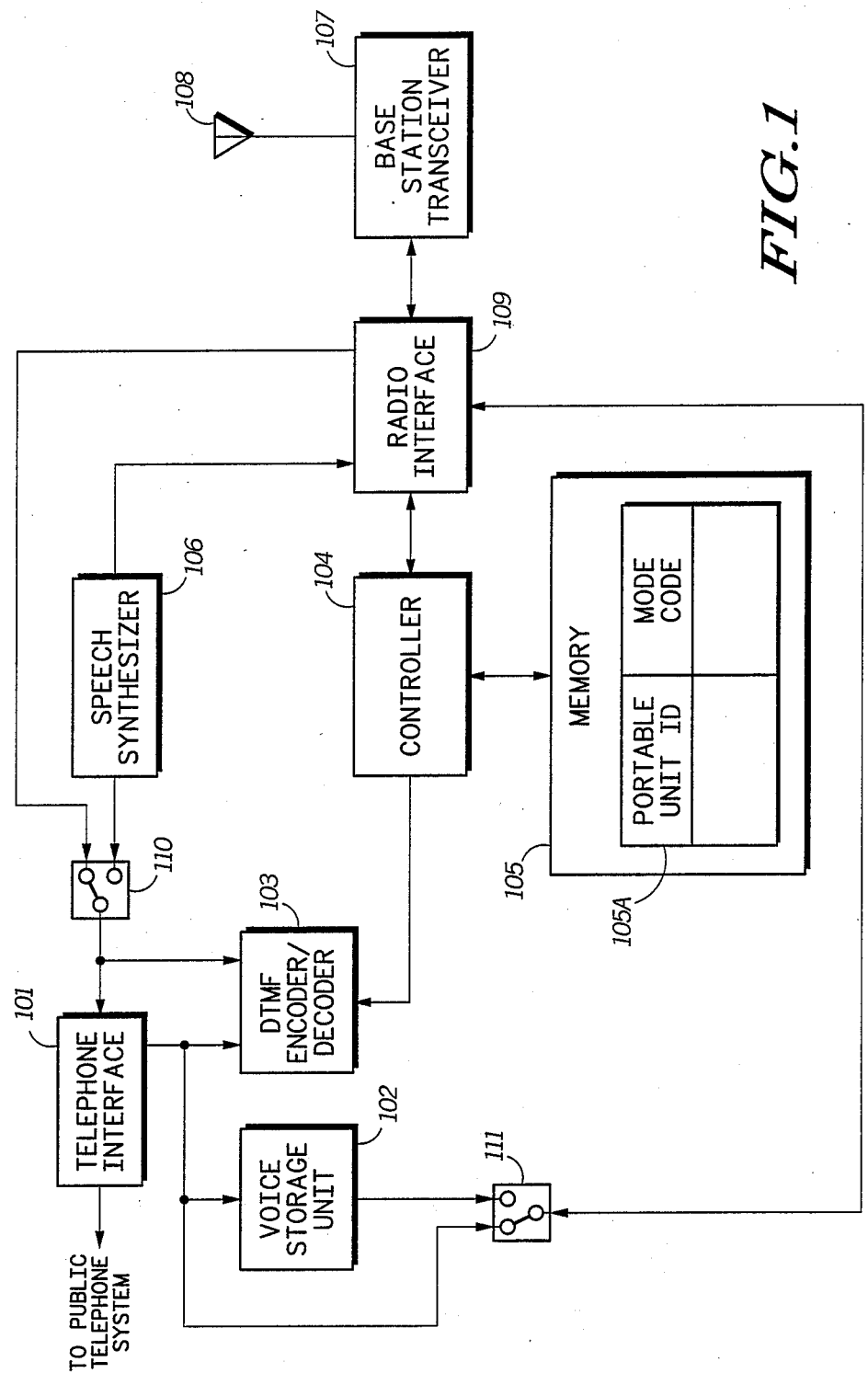
FIG. 1 is a block diagram of the radio base station.

FIG. 1 is a block diagram of the base station. Referring to this figure, a well known telephone interface 101 is connected to one or more telephone lines of a public or private telephone system. The particular type of telephone interface selected will depend upon the requirements of the installation site. For the purpose of illustration, however, we shall assume a line level telephone interface, although other well known types of telephone interfaces may also be utilized. Preferably, telephone interface 101 is capable of establishing connections to more than one telephone number.

The audio output of telephone interface 101 is connected to the inputs of a voice storage unit 102 and a well known dual tone multi-frequency (DTMF) encoder/decoder 103. Voice storate unit 102 is well known in that art and is preferably of the continuously variable slope delta modulation (CVSD) or adaptive differential pulse code modulation (ADPCM) type. In the alternative, an analog to digital (A/D) and digital to analog (D/A) converter can be substituted for voice storage unit 102, with the digitized voice messages being stored in memory 105.

Controller 104 is preferably a well known microprocessor, microcontroller or microcomputer, although any programmable computer type device may also be suitable. For simplicity, the only illustrated interconnections between circuit elements are for signal flow. In addition to these signal lines, non-illustrated control lines interconnect controller 104 to each and every other element (101-103 and 105-111) in FIG. 1. Memory 105 is a well known memory device such as random access memory (RAM), into which a table of operating mode information 105A is stored.

Mode table 105A is an array of ordered pairs of numbers, the first number in each ordered pair being a unique number indicative of a particular remote unit (i.e., a remote unit "indentification number" or "address"), while the second number is indicative of the current communication or operating mode of the corresponding remote unit. These modes include an "Open Communication" mode, a "Message Storage" or "Meeting" mode, and a "Call Screening" mode. In addition to the operating mode, the second number may also indicate the present status of a particular remote unit. For example, if a remote unit is presently communicating with another remote unit or telephone number, a code would be stored in table 105A to indicate a "Busy" statur for this particular remote unit. Similarly, if a remote unit is out of range of the base station, an "Out of Range" status indication may be stored in the table for that particular remote unit.

In the Message Storage mode, a remote unit or telephone call originator is informed of the current operating mode of the called unit by sending an appropriate prerecorded message to the call originator from speech synthesizer 106. This prerecorded message will invite the call originator to store a voice or alphanumeric message for later retrieval by the called unit. When the operating mode of a particular remote unit changes from the Message Storage mode to the Open Communication mode (or, optionally, to the Call Screening mode) any stored messages may be automatically transmitted to the remote unit.

For emergency calls, each remote unit operator may provide selected individuals with a pre-programmed "Override Code." Thus, if a call originator is informed that a particular remote unit is in the Message Storage mode, and the call originator enters the appropriate Override Code through the call originator's telephone or remote unit keypad, voice communications will be established between the call originator and the called remote unit, despite the fact that the remote unit is currently in the Message Storage mode.

In the Open Communication mode, normal voice communications may be established between the call originator and the called remote unit in a conventional, well known manner. If the called remote unit is currently communicating with another remote unit or telephone number, i.e., if the called remote unit is "busy," the caller is informed of the current status of the called unit and is invited to store a message as in the Message Storage mode, or the caller is invited to call back at a later time. Similarly, if the called unit is out of radio range (or simply out of service), or the remote unit operator fails to respond to call within a predetermined period of time, the call originator is also invited to store a message.

When a base station directs a transmission to a particular remote unit, the remote unit automatically responds to that transmission by transmitting an acknowledgement code back to the base. Transmission of this acknowledgement code occurs regardless of any action taken by the remote unit operator. Thus, the base station assumes that the called remote unit is out of range when no acknowledgement code is received in response to a base station transmission directed to that unit. If the remote unit is within radio range and only the acknowledgement code is received within a predetermined period of time, the call is assumed to be "unanswered" and the call originator is invited to store a message as in the Message Storage mode.

In the Call Screening mode, the call originator is informed of the current operating mode of the called remote unit and is invited to store a message as in the Message Storage mode. In this mode, however, the message is also forwarded (i.e.,transmitted) to the called remote unit and the called remote unit can "pickup" the call and establish normal voice communications by interrupting the message. Interruption of the message may be accomplished by entering an appropriate code through the keypad of the remote unit, or simply activating the transmitter of the remote unit through the "push-to-talk" switch. In the former case, the remote unit's controller detects that a "pickup" code has been entered through the keypad and the controller generates a corresponding digital code for transmission back to the base station. Upon receipt of the pickup code, the base station controller interrupts the message storing process and establishes a voice communication path between the call originator and the called remote unit.

Speech synthesizer 106 includes a well known digital to analog converter, preferably of the CVSD or ADPCM type, and a well known memory device, such as a programmable read only memory (PROM), in which selectable, pre-programmed digitized voice messages are stored. A well known base station transceiver 107 and antenna 108 includes one or more radio transmitters and one or more radio receivers. Transceiver 107 is connected to the other circuits through a well known radio interface that includes appropriate switches and driver circuits. As with telephone interface 101, radio interface 109 is dependent upon the particular type to transceiver being used at a particular installation site.

Switch 110 selects either the audio output of radio interface 109 or the output of speech synthesizer 106 as an audio input to telephone interface 101. Similarly, switch 111 selects either the audio output of telephone interface 101 or the output of voice storage unit 102 as an audio input to radio interface 109.

Figure 2:
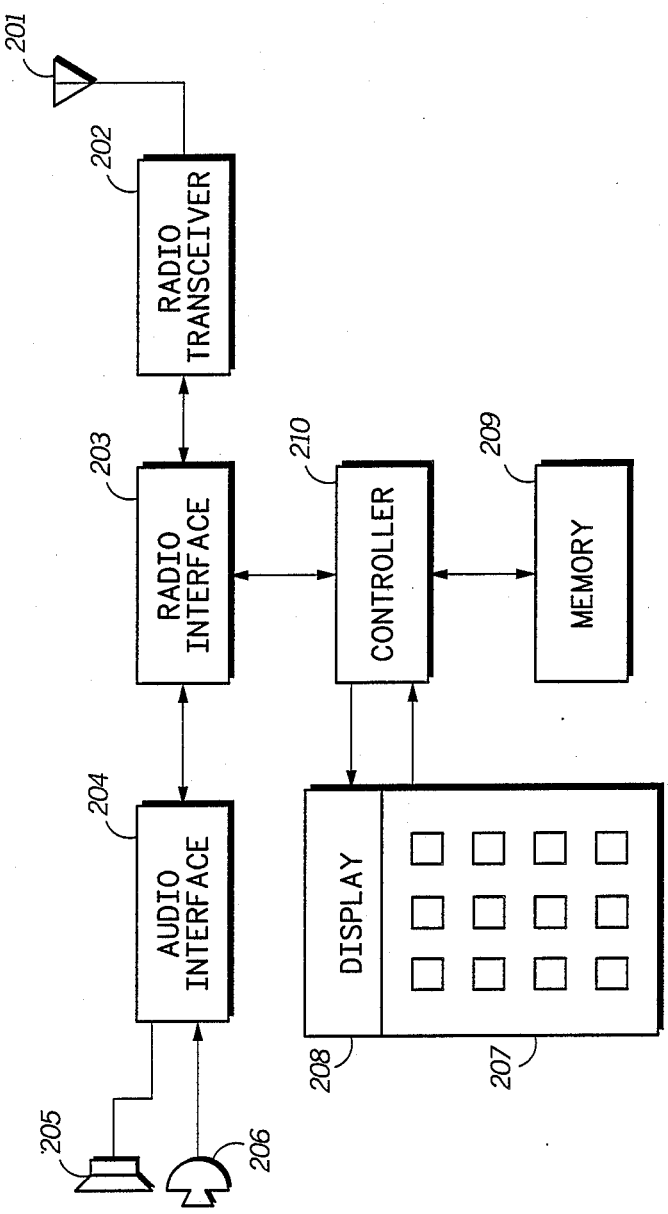
FIG. 2 is a block diagram of the remote radio unit.

FIG. 2 is a block diagram of a remote radio unit, for example, a mobile or portable transceiver. Referring to this figure, the remote unit includes a well known radio transceiver 202 which is coupled to an antenna 201. The audio output and modulation input of radio transceiver 202 are coupled to a well known radio interface 203. A well known audio interface circuit 204 includes appropriate audio amplifiers to drive speaker 205, and appropriate microphone amplifiers to amplify the signal from microphone 206. These audio signals are coupled to radio interface 203. A well known keypad 207 and display 208 provide a means for entering and displaying digital information, respectively. One function of keypad 207 and display 208 is to provide a means for selecting a particular communications or operating mode. To select a particular mode, the operator depresses a particular predetermined key or pattern of keys on the keypad to transmit a new mode code to the base station. In the alternative, a simple switch may be used to select the operating mode of the remote unit. The actuation of this key or pattern of keys is sensed by controller 210 and an appropriate digital code is generated and transmitted back to the base station through radio interface 203, transceiver 202 and antenna 201. Controller 210 also generates a unique digital remote unit identification or "address" code which is transmitted along with the operating mode code.

Controller 210 is preferably a microprocessor or microcomputer, although any computer type device may be suitable. Memory 209 is preferably a random access memory (RAM), although other types of memory may also be suitable. As in FIG. 1, the only interconnections illustrated in FIG. 2 are for signal flow. In addition to these signals, non-illustrated control lines interconnect controller 210 to each and every element (202 –207 and 209) in FIG. 2.

Software

Figure 3A:
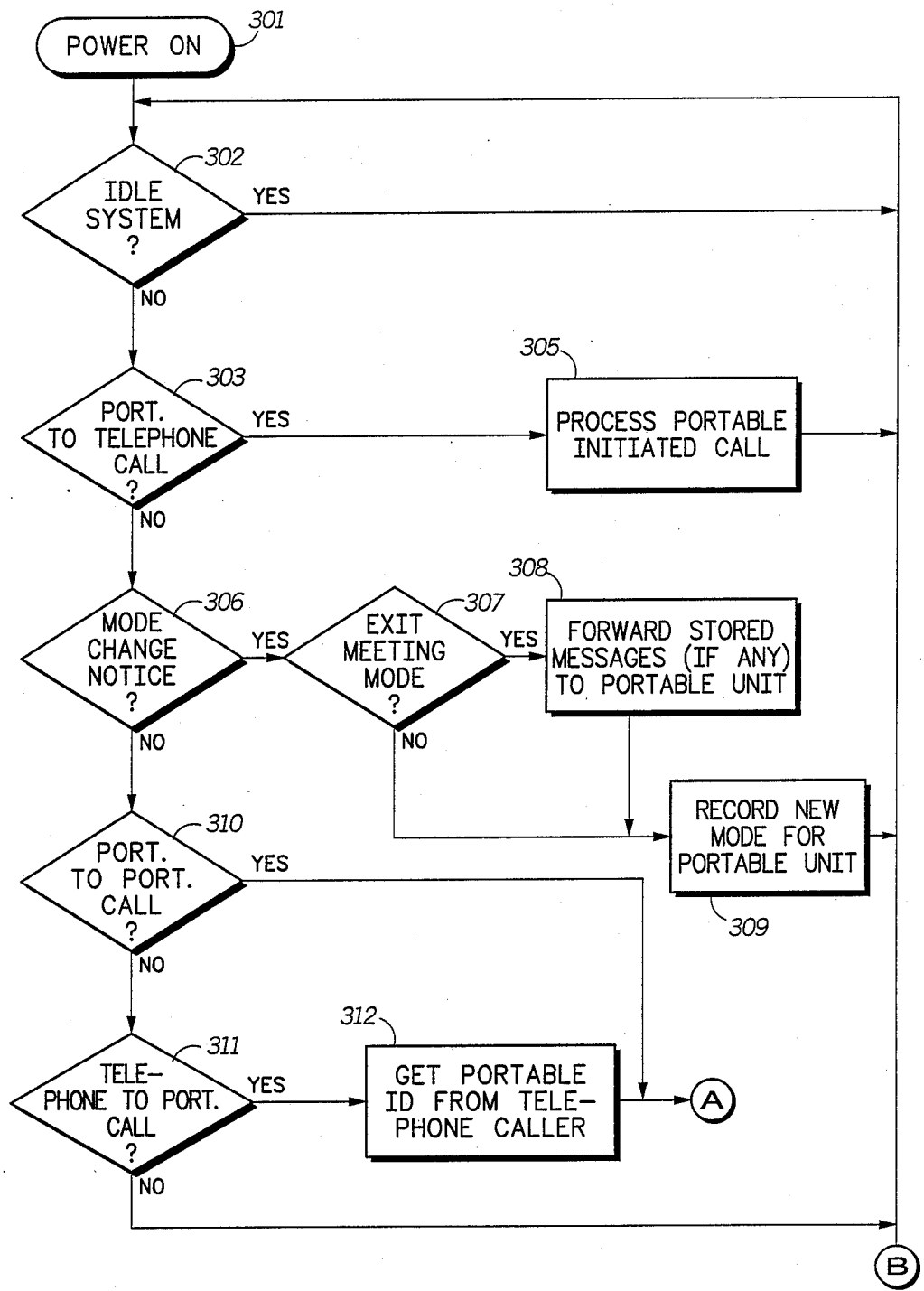
FIGS. 3A-3C include a flow chart of the software for the base station controller.
Figure 3B:
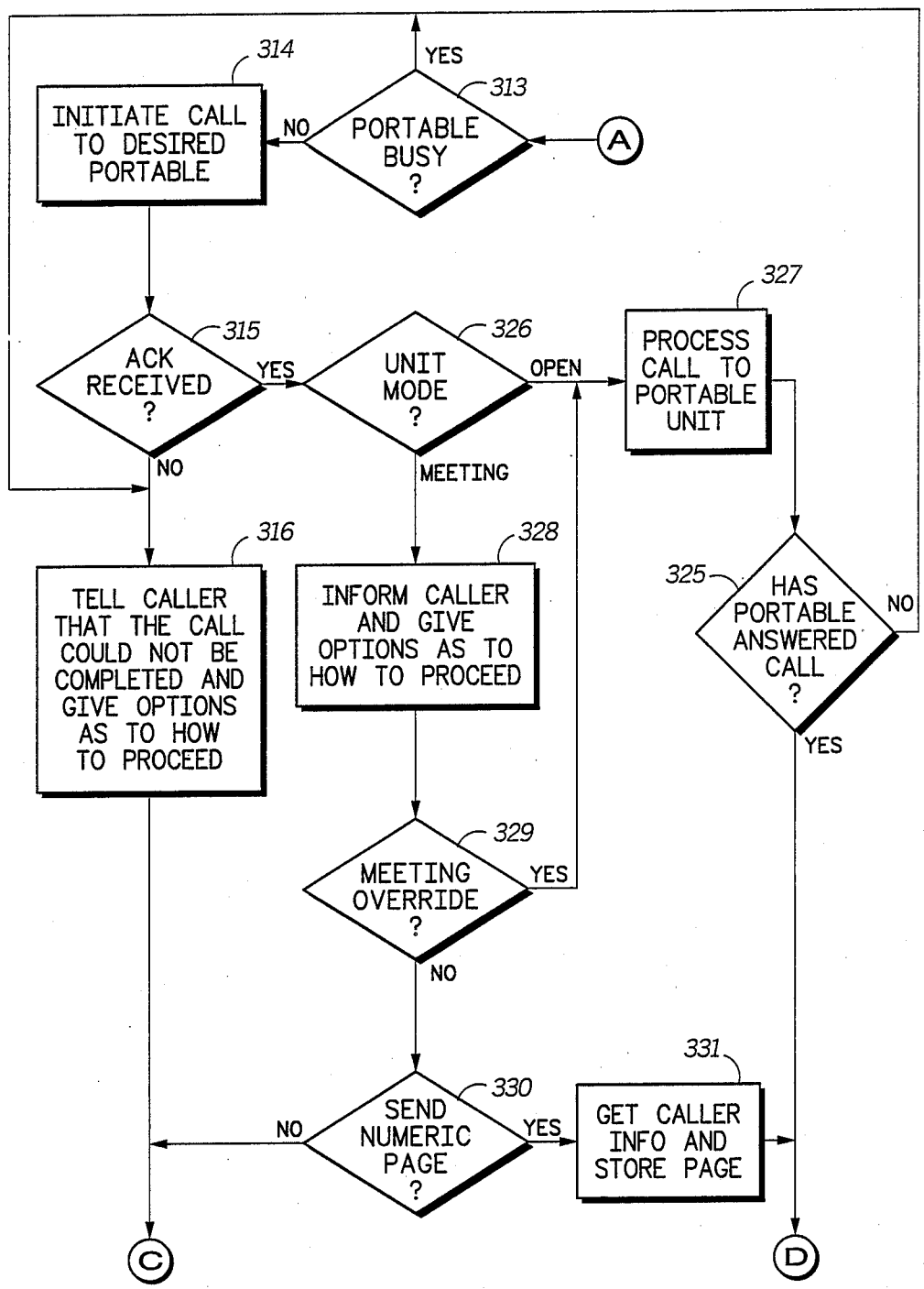
Figure 3C:
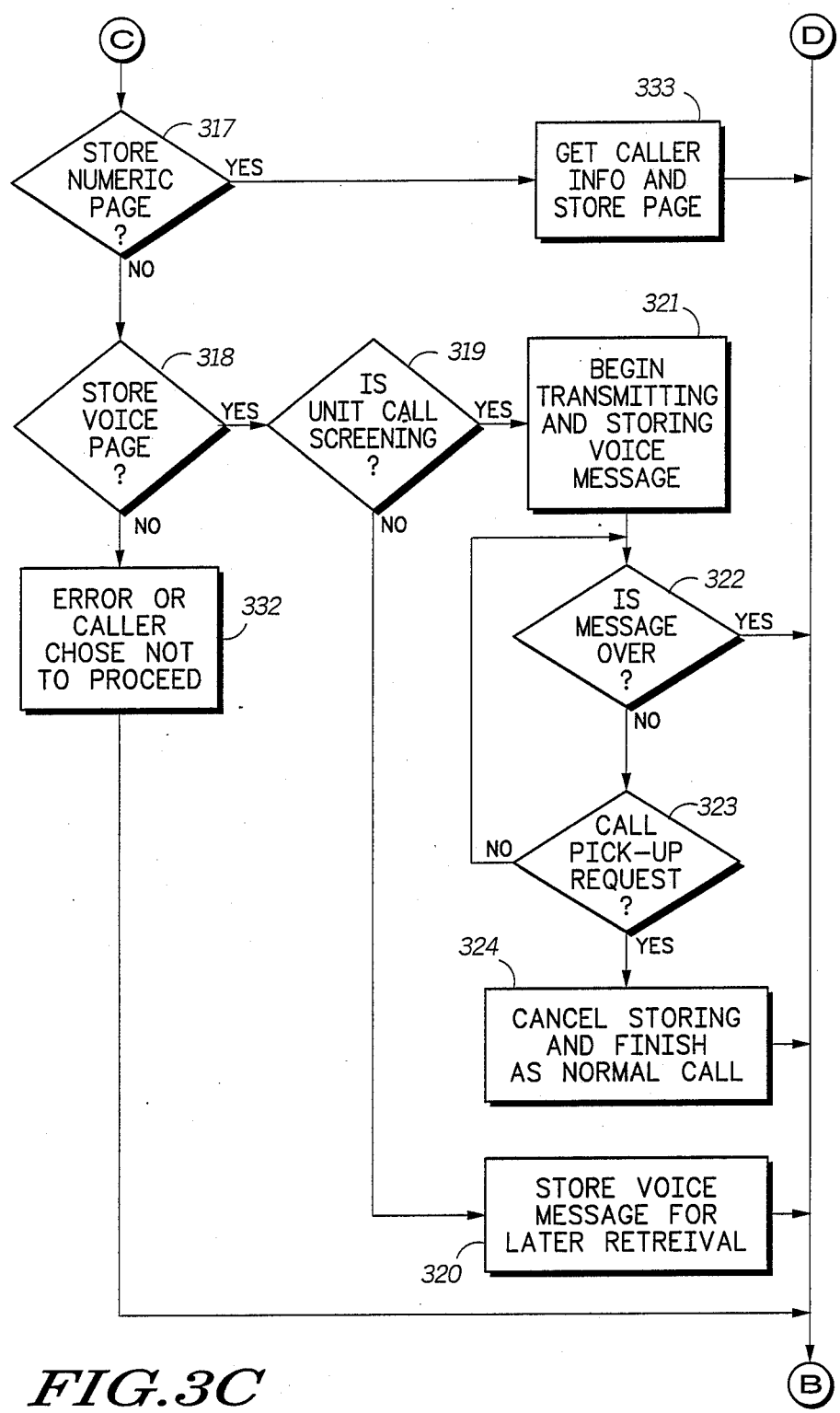

The term "portable" unit is used in the flowcharts of FIGS. 3A-3C because, in the typical application, the remote unit is a portable unit. It should be understood, however, that other types of remote units are implied, such as transportable, mobile of fixed remote units.

A flow chart of the software for base station controller 104 is illustrated in FIGS. 3A-3C. Referring to these figures, the program begins at step 301. If any event has occurred in the system that requires some action by the controller, the program branches at step 302 to step 303. Otherwise, the program remains at step 302 until some controller action is required. If a remote unit has requested a connection to a particular telephone number, the program branches at step 303 to step 305 wherein the call is processed. Otherwise, the program branches to step 306.

To request a telephone call, the operator of the remote unit enters the appropriate code on the remote unit's keypad, followed by the telepIhone number. This information is encoded by the remote unit and transmitted to the base station. Upon receiving and decoding this information, base station controller 104 sends the appropriate commands to telephone interface 101 to initiate the call. If the called telephone answers, the controller sends the appropriate commands to telephone interface 101, switch 110, radio interface 109 and base station transceiver 107 to establish voice communications between the remote unit and the called telephone.

If a remote unit has transmitted an operating mode change, the program branches at step 306 to step 307. At step 307, the program branches to step 308 if the mode has been changed from the Message Storage mode to some other mode. At step 308, any messages that were stored for this particular remote unit are transmitted or "forwarded" to the remote unit. This includes both stored voice messages and stored digital messages. If the mode change is from any other mode (i.e., any mode except the Message Storage mode) to another mode, the program branches at step 307 to step 309 wherein the new operating mode is stored in table 105A. (Table 105A of FIG. 1 is a schematic representation of an operating mode storage table of memory 105 in which the unit ID of each remote unit in the system is associated with current operating mode of that unit.) After completing step 309, the program returns to step 302.

Returning to step 306, if no mode change notice has been received, the program branches to step 310. If a remote unit has requested a call to another remote unit, the program branches at step 310 to step 313. Otherwise, the program branches to step 311. If a telephone caller has requested a call to a remote unit, the program branches at step 311 to step 312 wherein the base station requests the ID of the called remote unit from the telephone caller. The base station requests the remote unit's ID by transmitting a stored voice message through speech synthesizer 106. After completing step 312, the program proceeds to step 313. If a request for a telephone to portable call has not been received by the base station, the program branches at step 311 to step 302.

If the called unit is busy, the program branches at step 313 to step 316 wherein the call originator is informed that the call could not be completed, and the call originator is given options as to how to proceed. This infomation is conveyed to the caller through speech synthesizer 106. In next step 317, of the caller selects the "store numeric page" option, the program branches to step 333 wherein the numeric information is received from the caller and stored in memory 105. The caller typically enters this information through the keypad of the remote unit or telephone. If entered through a telephone keypad, the numeric information is transmitted over the telephone lines as a DTMF code and is subsequently deocded by DTMF encoder/decoder 103. If the caller selects the "voice page storage" option, the program branches at step 318 to step 319. If an error occurs or the caller chooses not to proceed, the program branches from step 318 to step 302 through step 332.

In step 319, if the called unit is not the Call Screening mode, the program branches to step 320 wherein the call originator's voice message is stored for later retrieval. If the called unit is in the Call Screening mode, the program branches at step 319 to step 321 wherein the voice message from the call originator is not only stored, but also transmitted to the call unit. If the message being stored and transmitted by the call originator has not been completed, the program branches at step 322 to step 323 wherein the base station inquires as to whether the called unit has transmitted a request to "pickup" the call from the call originator. If a call pickup has not been requested, the program branches back and forth between steps 322 and 323 unitl the message is completed (or a pickup code is received) whereupon the program branches to step 302. If the called station has requested a pickup, the program branches at step 323 to step 324 wherein the message being stored is cancelled and a normal voice connection is established between the call originator and the called unit. After completing step 324, the program returns to step 302.

Returning to step 313, if the called unit is not busy, the program branches to step 314 wherein the base station initiates a call to the called remote unit. In next step 315, the base station looks for an acknowledgement code to be transmitted back from the called remote unit. If this acknowledgement code is not received, the base station assumes that the remote unit is out of range (or out of service) and the program branches at step 315 to step 316. If the acknowledgement code is received, the program branches at step 315 to step 326.

In step 326, base station controller 104 checks table 105A to determine the present operating mode of the called unit. In the alternative, the operating mode may be stored in the remote unit and transmitted back to the base station as part of the acknowledgement transmission. If the called unit is in the Open Communication mode, the program branches at step 326 to step 327 wherein the call is processed to the remote unit. In next step 325, if the called unit has not answered the call, the program branches to step 316 wherein the call originator is given the option to leave a message. If the called unit answers the call, the program branches at step 325 back to step 302 after the call has been completed.

Returning to step 326, if the called unit is in the Message Storage mode, the program branches to step 328 wherein the call originator is informed that the particular called unit is in the Message Storage mode and the call originator is given options as to how to proceed. As before, this information is conveyed to the call originator through speech synthesizer 106. If the call originator knows the Message Storage mode Override code for the called unit, and the call originator enters the Override code in response to an interrogation from speech synthesizer 106, the program branches at step 329 to step 327, thereby overriding the Message Storage mode. If the call originator does not enter the Override code, the program branches at step 329 to step 330. In step 330, the call originator is given the option to send a numeric page. If the call originator chooses this option, the program branches to step 331 whereupon a numeric page is sent to the called unit. If the call originator chooses not to send a numeric page, the program branches at step 330 to step 317.

Figure 4:
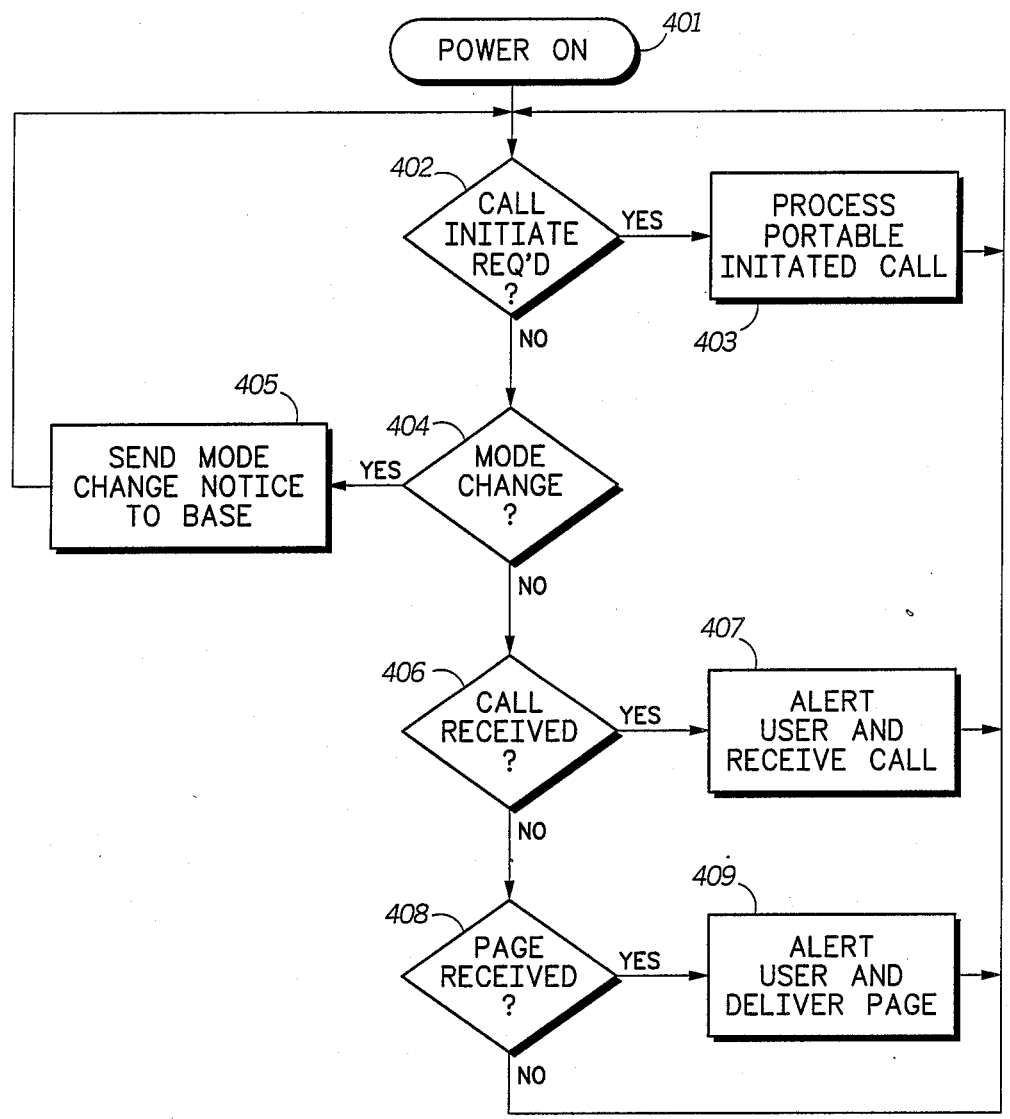
FIG. 4 is a flowchart of the software for the remote unit controller.

FIG. 4 is a flow chart of the software for the remote unit controller. Referring to this figure, the program begins at Power On at step 401. If a request to originate a call to a telephone or another remote unit has been entered on the keypad of this particular remote unit, the program branches at step 402 to step 403 whereupon the request is processed and the appropriate code for the request is transmitted back to the base station. Upon receiving a call initiate request from a remote unit, the base station processes this request as described above with reference to FIG. 3. If a mode change is entered on the keypad (or mode selection switch) of the remote unit, the program branches at step 404 to step 405 whereupon the appropriate code corresponding to the newly selected operating mode is transmitted back to the base station. If a call has been received, the program branches at step 406 to step 407 wherein the remote unit is alerted as to the incoming call and voice communications are established between the call originator and the remote unit. If a page has been received, the program branches at step 408 to step 409 whereupon the remote unit alerts the operator and delivers the page. If the page is a voice page, the page will be routed through the audio interface to the speaker of the remote unit. If the page is a digital page, the page will be routed through the controller to the display of the remote unit.

We claim as our invention:

1. A radio communications system, comprising in combination:
    a remote unit, comprising in combination:
        remote unit transceiver means for tranmitting radio signals to and receiving radio signals from a base station;
        selecting means for selecting one of a plurality of operating modes, said operating modes including at least a message storage mode and a communication mode; and
        means for transmitting a code indicative of the selected operating mode;
    a radio base station, comprising in combination:
        base station transceiver means for transmitting radio signals to and receiving radio signals from said remote unit;
        code storing means, coupled to said base station transceiver means, for storing the code transmitted by said remote unit and received by said base station transceiver means;
        means for communicating with a call originator;
        message storing means, coupled to said communication means, for storing a message from said call originator when the code stored in said code storing means is indicative of said message storage mode; and
        communication means, coupled to said communicating means and said base station transceiver means, for establishing communications between said call originator and said remote unit when the code stored in said code storage means in indicative of said communication mode.

2. The communications system of claim 1, wherein said base station further comprises means for informing said call originator that the code stored in said code storing means is indicative of said message storage mode and for inviting said call originator to store a message.

3. The communications system of claim 1, wherein:
    said operating modes further include a call screening mode;
    said message storing means further includes means for storing a message when the code stored in said code storing means is indicative of said call screening mode; and
    said base station further includes means for transmitting said message to said remote unit when the code stored in said code storing means is indicative of said call screening mode.

4. The communications system of claim 3, wherein said communication means further includes means for establishing communications between said call originator and said remote unit when the code stored in said code storing means is indicative of said call screening mode and a transmission has been received from said remote unit.

5. The communications system of claim 1, wherein said base station further includes message transmitting means for transmitting the message stored in said message storing means when the code stored in said code storing means changes from a first code indicative of said message storage mode to a second code.

6. The communications system of claim 1, wherein said communication mode further includes means for establishing communications between said call originator and said remote unit when the code stored in said code storing means is indicative for said message storage mode and a code representing an override command has been received from said call originator.

7. The communications system of claim 1, wherein:
    said base station includes means for communicating with a second call originator; and
    said message storage means includes for storing a message from said second call originator when communications are established between said remote unit and another call originator.

8. The communications system of claim 1, wherein said messages storage means includes means for storing a message from said call originator when said remote unit is out of raido transmission range of said base station.

9. The communications system of claim 1, wherein said message storage means includes means for storing a message from said call originator when the operator of said remote unit fails to answer a call from said call orignator within a predetermined period of time.

10. A radio base station, for use with a remote radio transceiver unit that includes means for transmitting a code indicative of a selected operating mode, said base station comprising in combination:

base station transceiver means for transmitting radio signals to and receiving radio signals from said remote unit;

code storing means for storing the code transmitted by said remote unit and received by said base station transceiver means;

message for communicating with a call originator;

message storage means, coupled to said communication means, for storing a message form said call originator when the code stored in said code storing means is indicative of a message storage mode; and communication means, coupled to said communicating means and said base station transceiver means, for establishing communications between said call originator and said remote unit when the code stored in said code storing means is indicative of a communication mode.

11. The base station of claim 10, further comprising means for informing said call originator that the code stored in said code storing means is indicative of said message storage mode and for inviting said call originator to store a message.

12. The base station of claim 10, wherein:

said message storing means further includes means for storing a message when the code stored in said code storing means is indicative of a call screening mode; and said base station further includes means for transmitting a message stored in said message storing means to said remote unit when the code stored in said code storing means is indicative of said call screening mode.

13. The base station of claim 12, wherein said communication means further includes means for establishing voice communications between said call originator and said remote unit when the code stored in said code storing means is indicative of said call screening mode and a transmission has been received from said remote unit.

14. The base station of claim 10, furhter comprising message transmitting means for transmitting a message stored in said message storing means when the code stored in said code storing means changes from a first code indicative of said message storage mode to a second code.

15. The communications system of claim 10, wherein said communication mode further includes means for establishing communications between said call originator and said remote unit when the code stored in said code storing means is indicative for said message storage mode and a code representing an override command has been received from said call originator.

16. The communications system of claim 10, wherein:

said base station includes means for communicating with a second call originator; and said message storage means includes means for storing a message from said second call originator when communications are established between said remote unit and another call originator.

17. The base station of claim 10, wherein said message storage means includes means for storing a message from said call originator when said remote unit is out of radio transmission range of said base station.

18. The communications system of claim 10, wherein said message storage means includes means for storing a message from said call originator when the operator of said remote unit fails to answer a call from said call originator within a predetermined period of time.

19. A remote radio unit for use with a radio base station that includes code storing means for storing a code transmitted by said remote unit, means for communicating with a call originator, and message storing means for storing a message from said call originator, said remote unit comprising in combination:

remote unit transceiver means for transmitting radio signals to and receiving radio signals from said base station;

selecting means for selecting one of a plurality of operating modes, said operating modes including at least a message storage mode and a communication mode; and means for transmitting a first code indicative of said message storage mode, such that, transmitting said first code to said base station instructs said base statioon to store a message from said call originator; and means for transmitting a second code indicative of said communication mode, such that, transmitting said second code to said base station instructs said base station to establish communications between said call originator and said remote unit.

20. The remote unit of claim 19, wherein:

said operating modes further include a call screening mode; and said remote unit further includes means for transmitting a third code indicative of said call screening mode, such that transmitting said third code to said base station instructs said base station to store a message from said call originator and to transmit the message from said call originator to said remote unit.

21. The remote unit of claim 20, further comprising means for transmitting a fourth code to said base station, such that, if the code stored in said code storing means of said base station is indicative of said call screening mode, transmitting said fourth code to said base station causes said base station to establish communication between said call originator and said remote unit.

22. The remote unit of claim 19, wherein said remote unit includes means for transmitting a third code to said base station, such that, if the code stored in said code storing means of said base station is indicative of said message storage mode, transmitting said third code to said base station causes said base statin to transmit any message stored in said message storing means of said base station to said remote unit.

23. The remote unit of claim 19, further comprising means for transmitting an acknowledgement code to said base station in response to a transmission from said base station, such that, the failure of said base station to receive said acknowledge code instructs said base station to store messages from said call originator.

* * * * *